United States Patent [19]

Tamura

[11] Patent Number: 5,107,646
[45] Date of Patent: Apr. 28, 1992

[54] WINDOW MOLDING MEMBERS AND METHOD OF MANUFACTURING SAME

[75] Inventor: Tatsuya Tamura, Yokohama, Japan

[73] Assignee: Hashimoto Forming Industry Co., Ltd., Yokohama, Japan

[21] Appl. No.: 233,049

[22] Filed: Aug. 17, 1988

[30] Foreign Application Priority Data

Sep. 29, 1987 [JP] Japan .................. 62-245371

[51] Int. Cl.⁵ .............................. E04B 1/62
[52] U.S. Cl. ..................... 52/208; 52/717.1; 52/718.1; 296/84.1
[58] Field of Search ............. 52/208, 400, 716, 717, 52/718; 296/84 R, 93

[56] References Cited

U.S. PATENT DOCUMENTS

| | | | |
|---|---|---|---|
| 3,583,757 | 6/1971 | Wilfert | 296/154 X |
| 4,249,356 | 2/1981 | Noso | 52/717 |
| 4,349,994 | 9/1982 | Maekawa | 52/208 |
| 4,458,459 | 7/1984 | Irrgang | 52/208 |
| 4,532,741 | 8/1985 | Knüdel | 52/208 X |
| 4,562,676 | 1/1986 | Kruschwitz | 57/208 |
| 4,568,119 | 2/1986 | Minami et al. | 52/208 X |
| 4,621,469 | 11/1986 | Kruschwitz | 52/208 |
| 4,757,659 | 7/1988 | Miyakawa et al. | 296/93 X |
| 4,757,660 | 7/1988 | Miyakawa et al. | 296/93 X |
| 4,833,847 | 5/1989 | Ihayama et al. | 52/208 |

FOREIGN PATENT DOCUMENTS 8692 1/1968 Australia.

Primary Examiner—Richard E. Chilot, Jr.
Assistant Examiner—Wynn E. Wood
Attorney, Agent, or Firm—Stevens, Davis, Miller & Mosher

[57] ABSTRACT

The disclosure relates to a molding member, for instance for automobile front window plates, as well as a method of manufacturing such molding members. The molding member has a lip section in the form of a ridge which extends throughout the entire length. The lip section bears against the surface of the window plate along the upper portion to realize a flush outer surface between the upper edge of the window plate and the body panel, but is spaced therefrom along the side portions to define a weir. The weir can be formed by deforming a predetermined location of the ridge, and prevents flow of the rain water across the molding member to preserve the driver's or passenger's sight through the window.

8 Claims, 11 Drawing Sheets

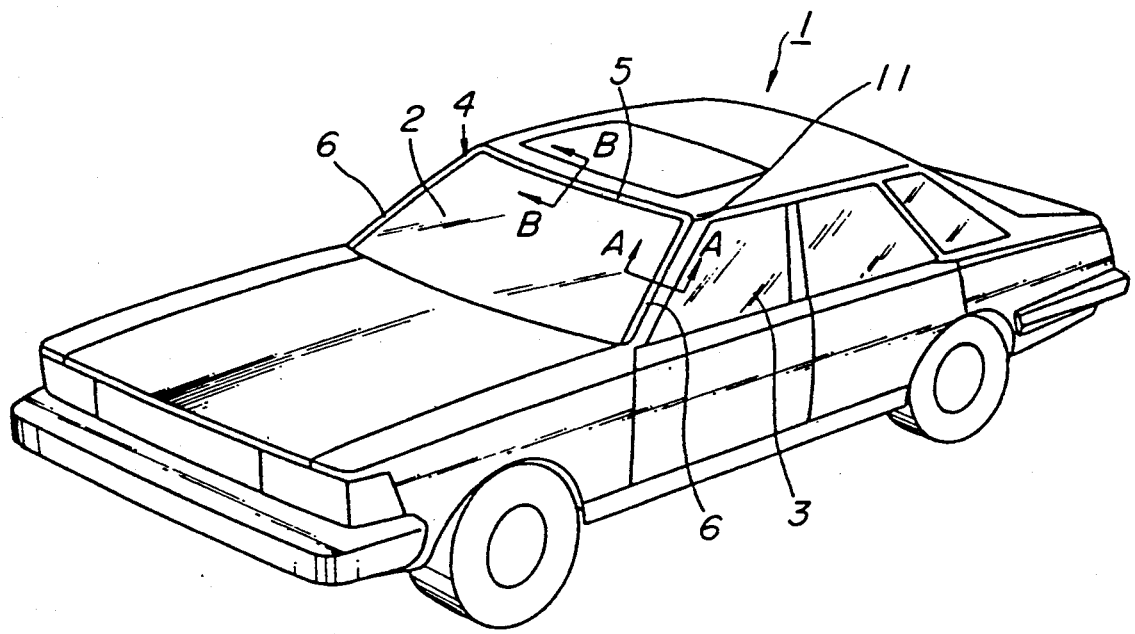
FIG_1

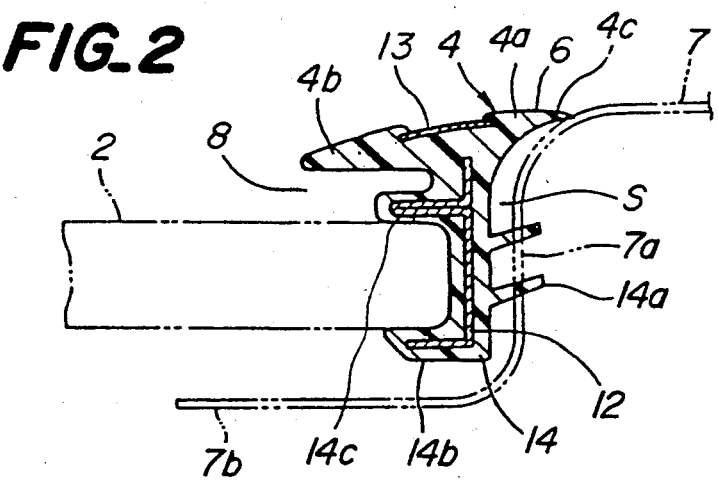
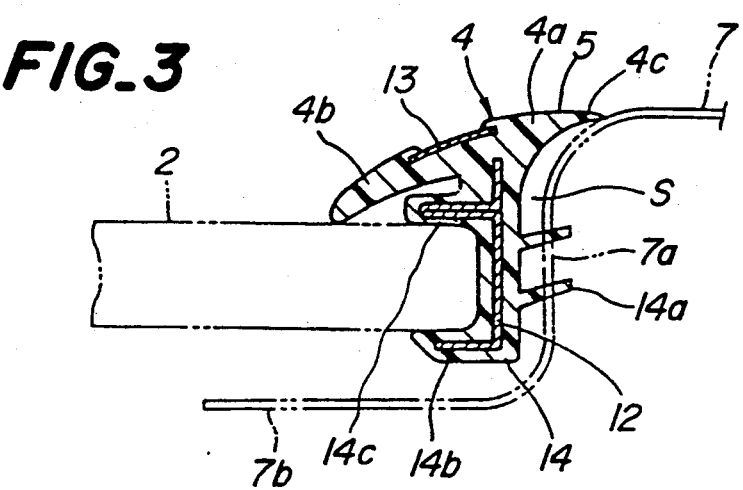
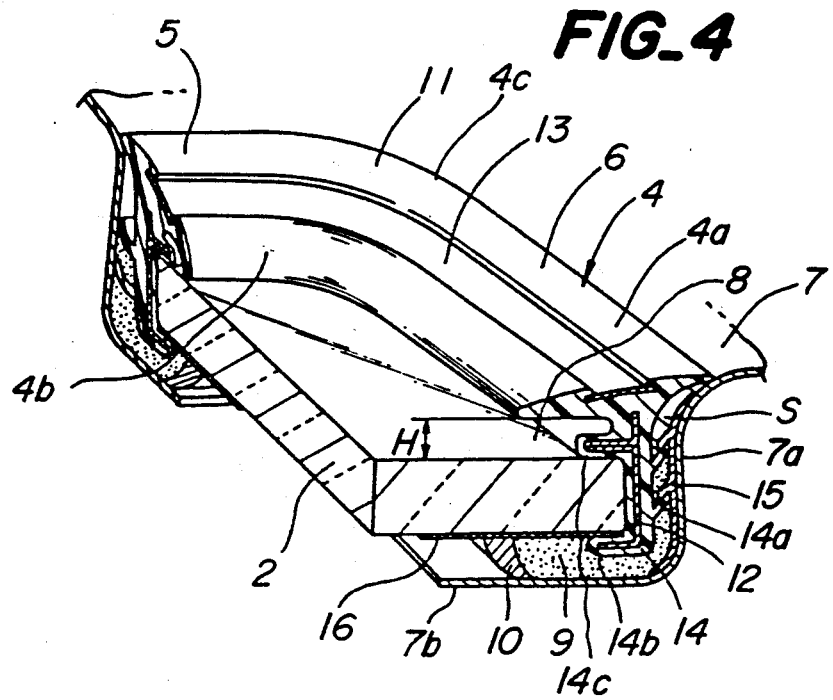

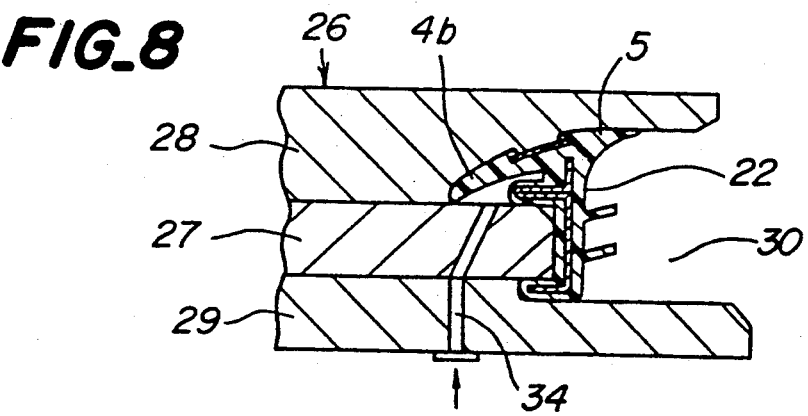
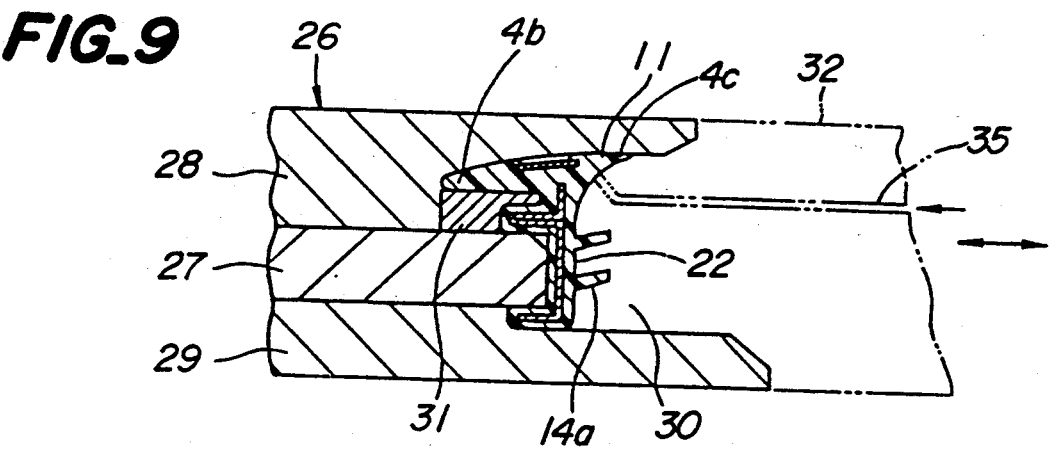
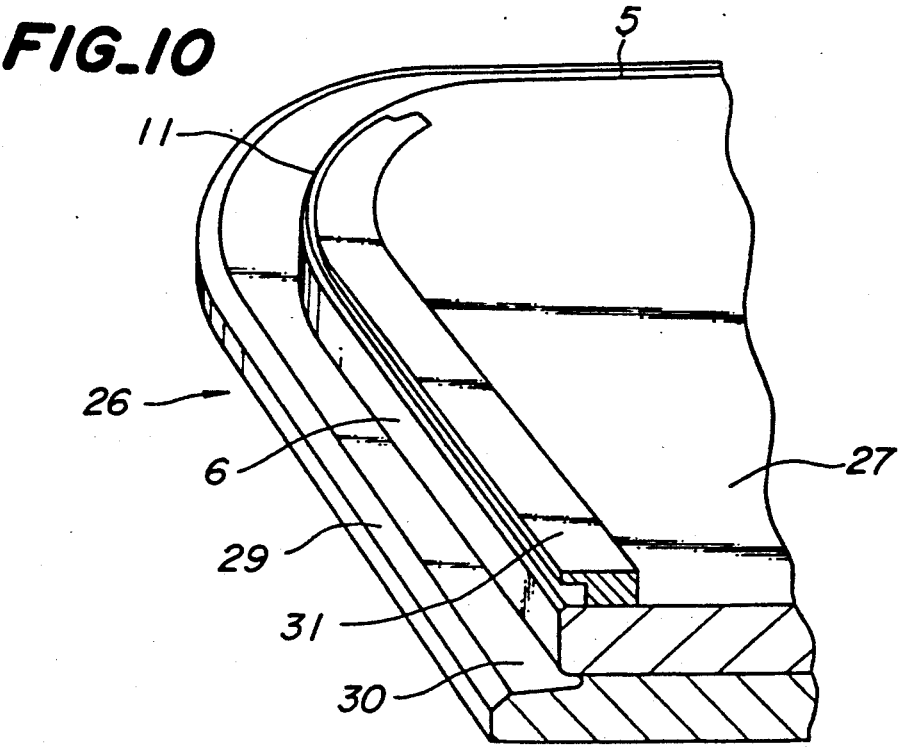

FIG._12 A
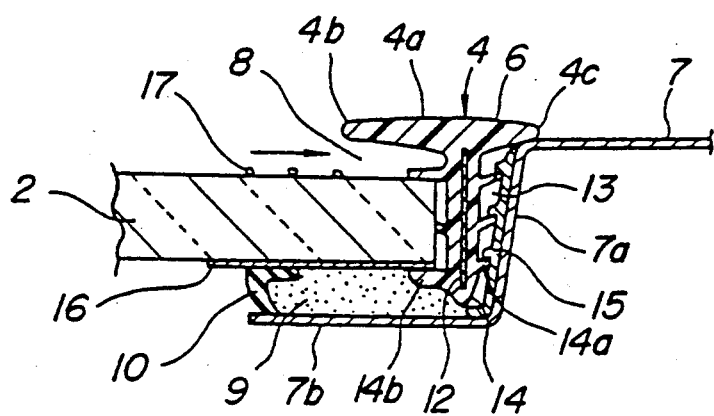
FIG._12 B
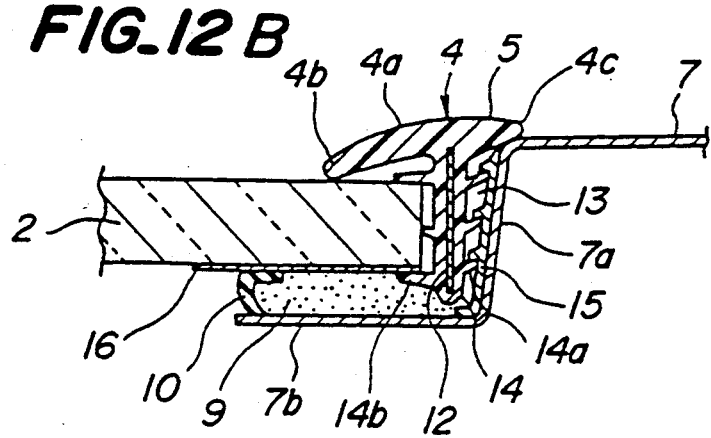
FIG._13
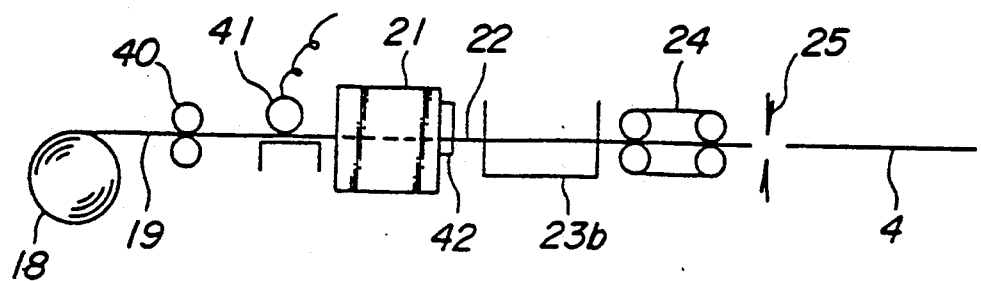

FIG._14
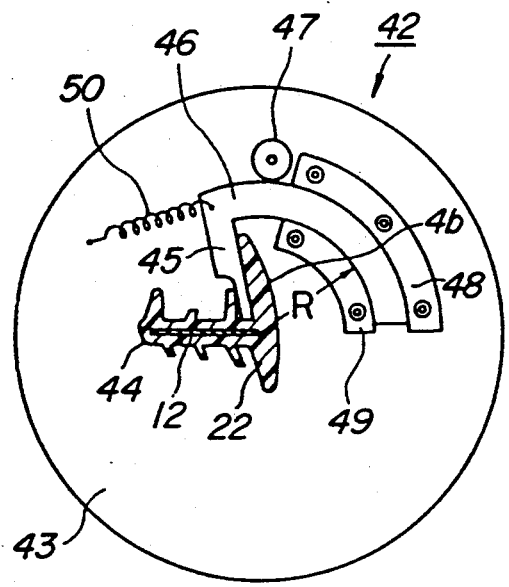
FIG._15
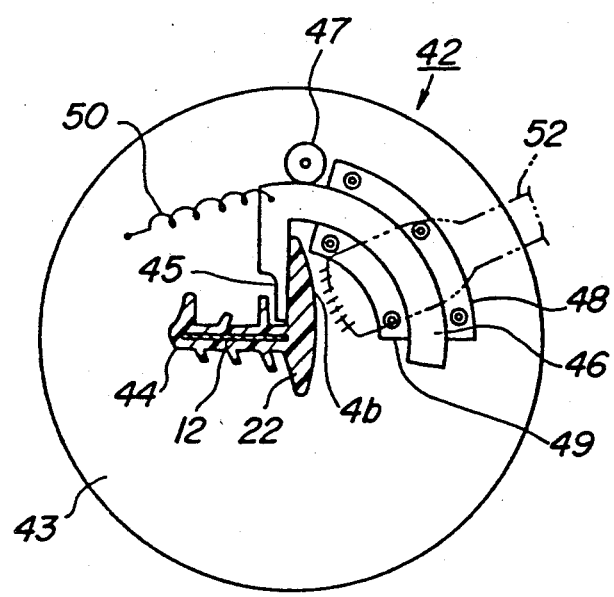
FIG._16
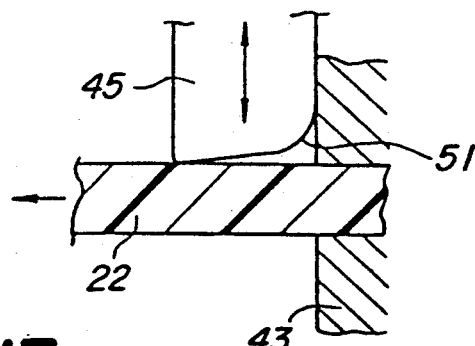
FIG._17
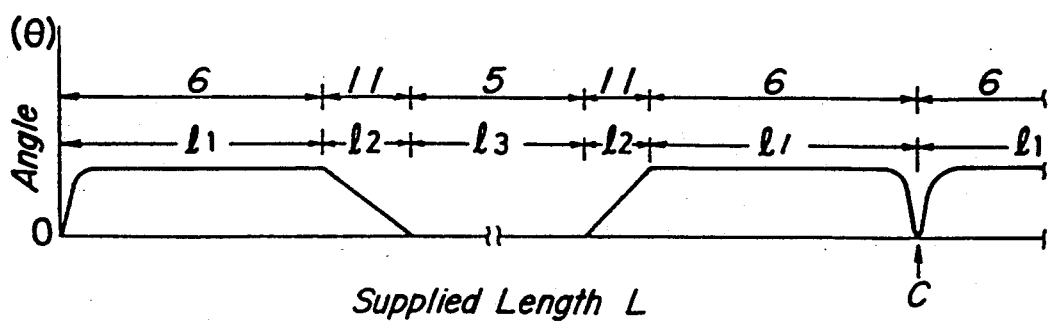

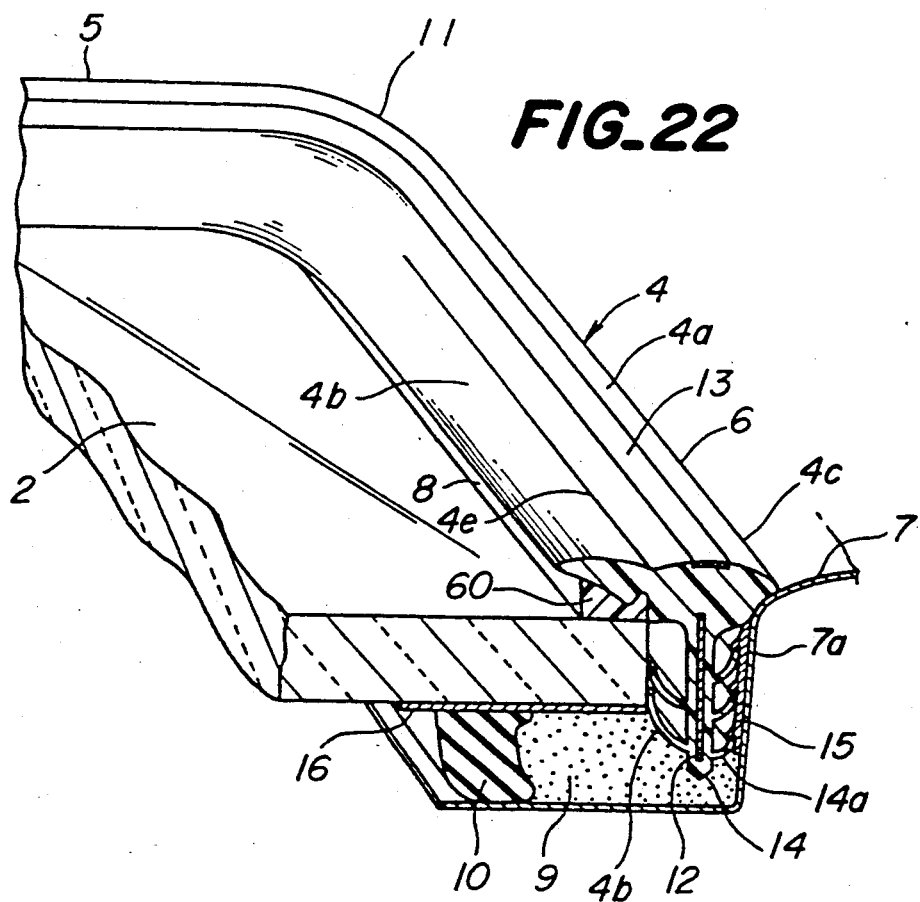
FIG_22
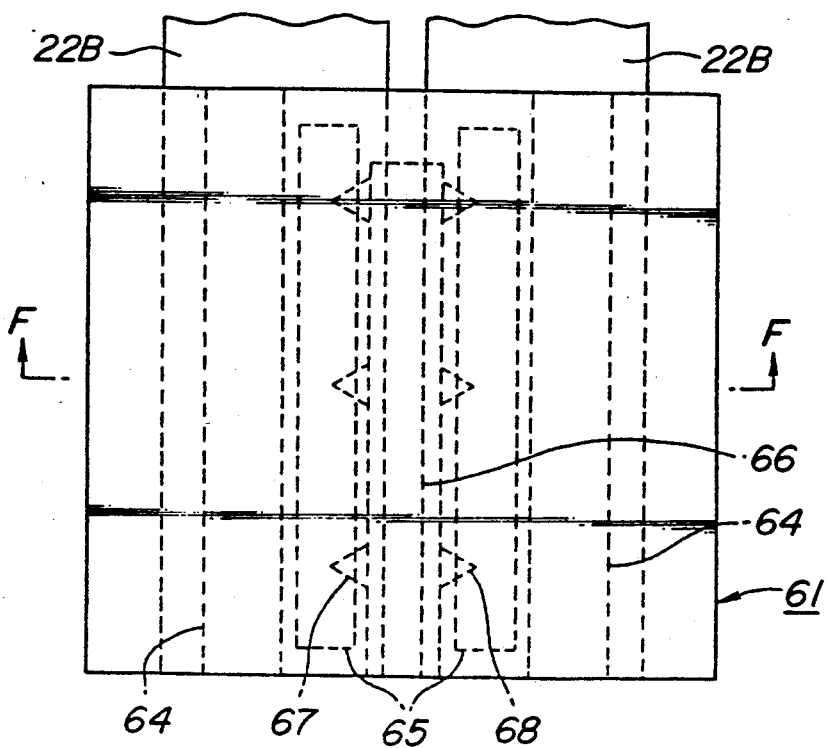
FIG_23

FIG_24
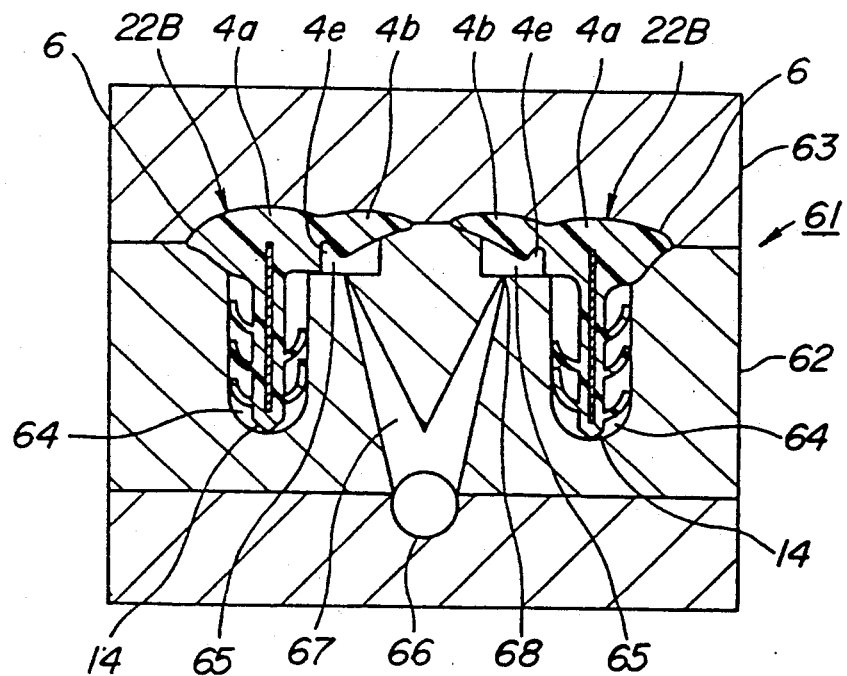
FIG_25
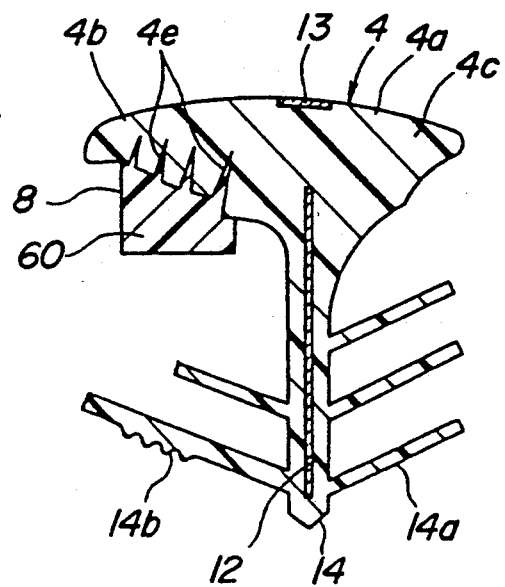

WINDOW MOLDING MEMBERS AND METHOD OF MANUFACTURING SAME

BACKGROUND OF THE INVENTION

1. Field of the Invention

The present invention relates to a window molding member, for instance for automobiles, as well as a method of manufacturing such molding members.

2. Description of the Related Art

An automobile employs various kinds of molding members, and a typical example thereof is a window molding member adapted to extend along the periphery of front or rear window plate, i.e. along a pair of front or rear pillars and the front or rear edge of the roof panel of the automobile body. A variety of requirements are imposed on molding members mainly from design, cost and/or functional viewpoint, and resulted in an increased demand in the automobile industry for the molding members whose cross-sectional shape varies in the longitudinal direction.

Specifically, one proposal is disclosed for example in Japanese Utility Model Application is directed to a window Publication No. 57-54,416, which molding member having an upper portion with a first predetermined cross-section, a pair of side portions with a second predetermined cross-section, and corner portions arranged between the side and upper portions, where the cross-section changes gradually from the first to the second. When the molding member is arranged along the periphery of a front window plate, the first cross-section of the upper portion contributes to realize a smooth, so-called flush outer surface of the automobile body, while the second cross-section of the side portions serves to define weirs along the side edges of the window plate.

Such an arrangement of the molding member ensures that, during the driving in a rainy condition, the weir prevents the rain water from flowing across the side portion toward the side window, effectively preserving the driver's and/or passenger's sight through the side windows.

To produce a window molding member with a cross-section which varies in the longitudinal direction, it has been a conventional practice to make use of a process including preparation of at least two core elements by shaping the raw metal strip into the respectively desired cross-sectional shapes with a roll forming device, etc., placing each core element in the mold of an injection molding machine, and subsequently molding the synthetic resin material into the desired configuration. With such a process, however, since the entire core element of the elongate molding member has to be completely accommodated in the mold, the molding machine as a whole becomes very bulky and requires a substantial space in the factory. Moreover, the process involves relatively complex steps with which the molding members can be produced only one by one, and it is thus difficult to improve the productivity.

Another possibility for producing such molding members is to physically divide each molding member into first and second extruded portions with the respectively predetermined cross-sectional shapes, which are connected with each other either by an injection molding process or by using a separate corner connection piece. However, connection of these portions by means of the injection molding accompanies formation of undesirable burrs along the junctions and resultant deterioration in the appearance, while use of the corner connection piece results in the increased number of the required components and assembly steps.

SUMMARY OF THE INVENTION

Therefore, it is a primary object of the present invention to provide a novel window molding member with an excellent appearance, having a longitudinally variable cross-section which can be readily produced in a facilitated manner and with an improved productivity.

Another object of the present invention is to provide a novel method whereby window molding members with a longitudinally variable cross-section can be produced in a facilitated manner and with an improved productivity.

According to one aspect of the present invention, there is provided a window molding member, for instance for automobiles, comprising: a main body composed at least partly of a continuous elongate member, including an upper portion to extend along an upper edge of a window plate, at least one side portion to extend along side edges of the window plate, and at least one corner portion integrally connecting said upper portion and said side portion with each other, the main body being further integrally formed with a ridge over the entire length thereof; said ridge having a first cross-section along said upper portion of the main body, a second cross-section along said side portion substantially of the main body, and a transitional cross-section substantially along said corner portion of the main body where the first cross-section gradually changes to the second cross-section, one of said first and second cross-sections being adapted to define at least one bank or channel or weir (hereinafter referred to as "weir") when the molding member is mounted in place, which extends along said upper portion or said side portion such that rain water can be guided along the weir and prevented from flowing across the molding member.

According to another aspect of the present invention, there is provided a method of manufacturing window moldings, for instance for automobiles, which method comprises the steps of: forming a main body composed at least partly of a continuous elongate material, including an upper portion to extend along an upper edge of a window plate, at least one side portion to extend along side edges of the window plate, and at least one corner portion integrally connecting said upper portion and said side portion with each other, the main body further having a integral ridge formed to extend over the entire length thereof; and deforming a predetermined location of said ridge such that the ridge has a first cross-section along said upper portion of the main body, a second cross-section along said side portion of the main body, and a transitional cross-section substantially along said corner portion where the first cross-section gradually changes to the second cross-section, one of said first and second cross-sections being adapted to define at least one weir when the molding member is mounted in place, which extends along said upper portion or said side portion so that rain water can be guided along the weir and prevented from flowing across the molding member.

In accordance with the present invention, the longitudinally variable cross-section of the molding member can be readily realized, by simply deforming the ridge to define a weir which extends along the side portion of the molding member when it is for a front window plate, or along the upper portion of the molding member when it is for a rear window plate. It is not necessary to prepare separate components of a molding member to be connected with each other either by an injection process or by corner connection pieces, so that the present invention makes it possible to highly improve the productivity and to preserve an excellent appearance of the product in an advantageous manner.

BRIEF DESCRIPTION OF THE DRAWINGS

FIG. 1 is a perspective view of an automobile with window molding members to which the present invention may be applied;

FIG. 2 is a cross-sectional view, taken along the line A—A in FIG. 1, of the side portion of a front window molding member according to one embodiment of the present invention;

FIG. 3 is a cross-sectional view, taken along the line B—B in FIG. 1, of the upper portion of the molding member of FIG. 2;

FIG. 4 is a fragmentary perspective view of the molding member of FIGS. 2 and 3;

FIGS. 7 to 9 are sectional views of the shaping station take along the lines C—C, D—D and E—E in FIG. 6, respectively;

FIG. 10 is a fragmentary perspective view of the shaping device;

FIG. 12A is a sectional view of the side portion of a window molding member according to another embodiment of the present invention;

FIG. 12B is a sectional view of the upper portion of the molding member of FIG. 11;

FIG. 13 is a system diagram of another example of the production line adapted to carry out the method of the present invention for producing the window molding members of FIGS. 11 and 12;

FIGS. 14 and 15 are side views of the shaping device included in the production line of FIG. 13, in different operational positions thereof;

FIG. 16 is a fragmentary sectional view thereof;

FIG. 17 is a diagram showing the relationship between the supplied length of the core strip material and the angular movement of the deforming bar;

FIG. 22 is a fragmentary perspective view of the molding member of FIG. 20;

FIG. 23 is a plan view of the injection die used to produce the molding member of FIG. 20;

FIG. 24 is a sectional view taken along the line F—F in FIG. 23; and

FIG. 25 is a cross-sectional view similar to FIG. 21, showing a modification of the molding member.

DETAILED EXPLANATION OF THE PREFERRED EMBODIMENTS

Figure 11A:
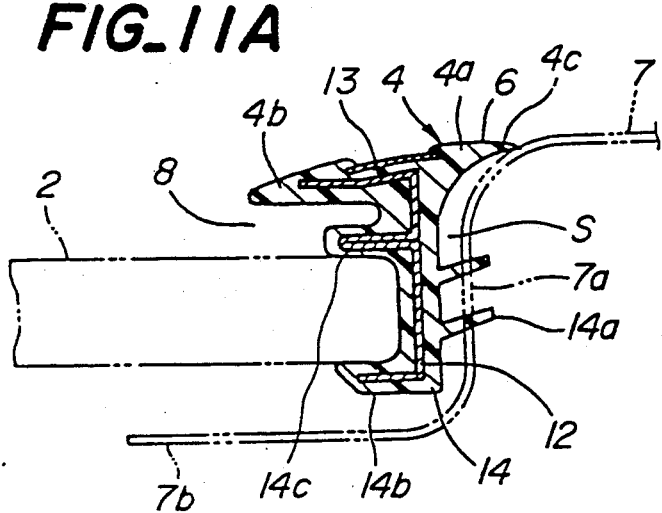
FIGS. 11A and 11B illustrate a lip section of a molding member deformed by a deformable core element which extends into the lip section.

The present invention will now be explained in further detail, by referring to some preferred embodiments shown in the attached drawings.

There is shown in FIG. 1 an automobile which is designated as a whole by reference numeral 1, and which includes a front window plate 2 and side window plates 3. The front window plate 2 may be composed of a transparent inorganic glass or transparent synthetic resin, such as polycarbonate resin, acrylic resin or the like. The window plate 2 is secured to the automobile body panel 7 as particularly shown in FIG. 4, by means of an adhesive material 9, with a rubber dam member 10 arranged between the window plate 2 and a depressed seat portion 7b of the body panel 7. The window plate 2 may be provided on its rear surface with an opaque printed layer 16 which extends along the periphery of the plate 2 such that the adhesive material 9 and the dam member 10 are not visible from outside, to realize a refined appearance.

The front window plate 2 is associated with an elongate window molding member 4 which is arranged to cover a gap or space S between the automobile body panel 7 and the peripheral edge of the front window plate 2. The molding member 4 has a pair of side portions 6 (FIG. 2) along the side edges of the window plate 2, an upper portion 5 (FIG. 3) along the upper edge of the window plate 2, and a pair of transient portions 11 (FIG. 4) where the cross section of the side portions 6 gradually changes to that of the upper portion 5.

The molding member 4 has a main body 4a composed of a flexible and/or soft polyvinylchloride (PVC) resin, ionomer resin, ethylene-vinylacetate (EVA) copolymer resin cellulose acetate butylate (CAB) resin, appropriate synthetic rubber material or other suitable thermoplastic and elastomeric synthetic resin material with a flexibility. The material forming the main body 4a is co-extruded with a core element 12 and optionally with an ornamental film 13, into an elongate member with a substantially constant cross-section throughout the entire length. The core element 12 is embedded into the material of the main body 4a, while the film 13 has an outer surface with a metallic luster or desired color, which is partly exposed outside.

The molding member 4 includes a leg section 14 extending into the space S between the automobile body panel 7 and the edge of the front window plate 2, as well as a pair of lip sections 4b, 4c formed on, and projecting from both sides of the leg section 14. These lip sections are each in the form of a ridge which extends along the entire length of the extruded elongate member. The lip section 4c has a free end bearing against the outer surface of the automobile body panel 7 in the upper and side portions 5, 6 of the molding member 4 (FIGS. 2 and 3). On the other hand, the lip section 4b has a free end which bears against the outer surface of the window plate 2 in the upper portion 5 (FIG. 3), but which is spaced therefrom by a distance H in the side portions 6 of the molding member 4 so as to define a weir 8 (FIG. 4).

The leg section 14 of the main body 4 has one or more fins 14a formed on that side which is remote from the window plate 2. These fins 14a are engageable with corresponding fins of a retainer 15 which is secured to a shoulder portion 7a of the body panel 7 adjacent to the depressed seat portion 7b. The leg section 14 has a free end in the form of a projection 14b which is engageable with the rear edge of the window plate 2. The leg section 14 may have an additional projection 14c which, in turn, is engageable with the front edge of the window plate 2. The core element 12 embedded in the main body 4 has such a profiled cross-section that it is present in these projections 14b, 14c.

The window molding member of the above-mentioned embodiment can be advantageously produced by the method according to the present invention, with a production line to be fully described hereinafter.

Figure 5:
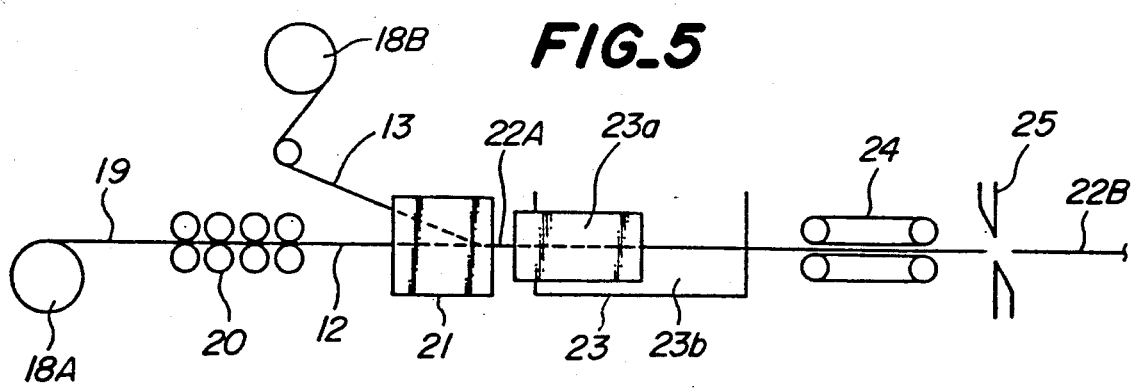
FIG. 5 is a system diagram of one example of the production line which is adapted to carry out the method of the present invention for producing the window molding members.

There is shown in FIG. 5 a system diagram of the production line which includes a first uncoiler 18A for continuously supplying a strip 19 to roll forming station 20, where it is shaped into the desired cross-sectional profile of the core element 12. The strip material 19 may be composed of an appropriate metal or synthetic resin sheet. The illustrated production line further includes an optional second uncoiler 18B for the continuous supply of the ornamental film 13. The core element 12 and the ornamental film 13 are fed to an extrusion die 21, and co-extruded with a thermoplastic resin material, such as PVC, into a continuous rod 22A. The so-formed continuous rod 22A is fed to a sizing/cooling station 23 which includes a sizing device 23a and a cooling tank 23b. At this station 23, the continuous rod 22A is subjected to a required sizing and also to a simultaneous cooling while being drawn by an appropriate drawing device 24. The continuous rod 22A is further fed to a cutting station 25, where it is successively cut into an elongate member 22B with a predetermined length.

The elongate member 22B with the predetermined length, obtained as above, is generally straight in its longitudinal direction, and has a constant cross-section along the entire length, corresponding to that of the molding member 4 in its side portion 6 (FIG. 2). Consequently, it is necessary to axially bend the elongate member 22B into conformity with the contour of the window plate 2, and also to locally deform the lip section 4b in order to realize the cross-section of the molding member 4 in its upper portion 7 (FIG. 3). It is from this reason that the production line further includes an axial bending and shaping device 26 to be described hereinafter.

The shaping device 26 includes, as particularly shown in FIGS. 6 to 10, a central die plate 27 and upper and lower die plates 28, 29 on both sides thereof. The die plates 27, 28, 29 are superimposed upon, and united with each other to form an integral abutment die assembly having in its outer periphery a shaping groove 30, which is adapted to receive the elongate member 22B. The central die plate 27 has an outer contour which substantially corresponds to that of the window plate 2. The upper die plate 28 is adapted to support the lip sections 4b, 4c of the main body 4, while the lower die plate 29 is to support the projection 14b of the leg section 14.

Figure 7:
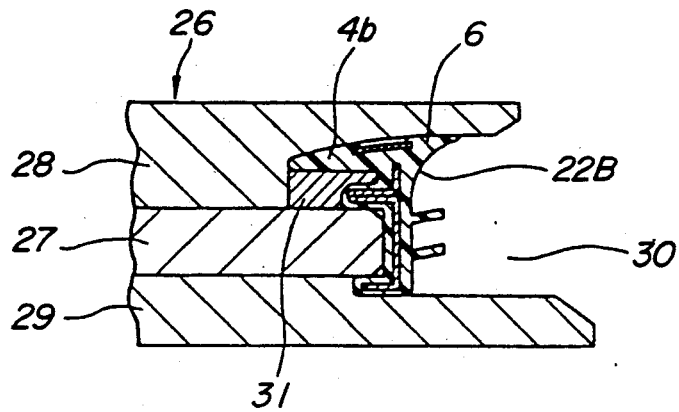

More particularly, the upper die plate 28 has a supporting surface for the lip sections 4b, 4c, which is of such a configuration that, as shown in FIG. 8, the free end of the lip section 4b for the upper portion 5 of the molding member 4 is urged against the central die plate 27. A spacer plate 31 is fixedly secured to the central plate 27, and extends locally along the outer periphery of the assembly between the central and upper die plates 27, 28, to cooperate with the upper die plate 28 such that the free end of the lip section 4b for the side portions 6 of the molding member is spaced from the central die plate 27, as shown in FIG. 7. Furthermore, the spacer plate 31 has a thickness which gradually changes along those regions of the die plate assembly corresponding to the corner portions 11 of the molding member, as shown in FIG. 10.

The shaping device 26 further includes a pair of backup dies 32 for supporting the elongate member 22B along the corner portions 11, a pair of chucks 33 for clamping both ends of the elongate member 22B, and steam supply pipes 34, 35 for supplying steam to heat the lip sections 4b, 4c for the upper and corner portions 5, 11 of the molding member.

The elongate member 22B is subjected to axial bending and also to local deformation of the lip section 4b in the following manner. First of all, the elongate member 22B is clamped at its both ends by the chucks 33, and is aligned with the groove 30 while being applied with a bending force by moving the chucks 33 in the direction of arrows Y in FIG. 6. Consequently, the elongate member 22B is axially bent to have a contour which corresponds to the contour of the central die plate 27 and, hence, of the window plate 2. At this occasion, steam is supplied from the pipe 34 so that the lip section 4b for the upper portion 5 of the molding member is heated above the softening point, and is subjected to a plastic deformation into the desired cross-section.

On the other hand, the lip section 4b for the side portions 6 of the molding member is supported between the upper die plate 28 and the support plate 31, and is thus prevented from deformation so as to maintain the cross-section as extruded. Furthermore, during the axial bending of the elongate member 22B, the lip section 4c and fins 14a on the outer side curvature along those regions corresponding to the corner portions 11 of the molding member are subjected to a tension during the axial bending, and may thus be deflected inwardly. Such an inward deflection is generally undesirable, and can be positively prevented by supporting the lip section 4c and fins 14a by means of the backup dies 32 while simultaneously supplying steam from the pipe 35 so as to heat them for allowing a slight axial elongation of the material to thereby relieve the tension.

The axial bending of the elongate member 22B and local plastic deformation of the lip section 4b are carried out as above, and the supply of the steam from the pipes 34, 35 is then stopped and may be followed by supply of cooling medium, such as cooled air. The lip section 4b for the upper portion 5 is cooled and resumes its original hardness while maintaining the deformed cross-section. The ends of the elongate member 22B are disengaged from the chucks 33 and cut away to form a finished molding member 4.

The molding member 4 produced as described above is mounted in place in the following manner. First of all, the retainer member 15 is adhered to the entire periphery, except the lower portion, of the shoulder portion 7a of an automobile body panel 7 which has already been subjected to painting and baking. The molding member 4 is secured to the window plate 2 by engaging the projection 14b of the molding member 4 with the rear edge of the window plate 2. The window plate 2 with an opaque printed layer 16 along the periphery on its rear side is provided with a rubber dam member 10, and is then applied with a liquid adhesive material 9 which is discharged along the entire periphery, including the lower portion, of the window plate 2. The window plate 2 is then fitted into the shoulder portion 7a of the body panel 7, with the molding member 4 retained by the retainer member 15, as a result of inter-engagement between the fins 14a of the leg section 14 and corresponding fins of the retainer member 15. The window plate 2 is firmly adhered to the seat portion 7b of the body panel 7 after the adhesive material 9 has been hardened.

The window molding member 4 mounted in place covers the space S between the window plate 2 and the automobile body panel 7. The free end of the lip section 4b along the upper portion 5 of the molding member 4 is in contact with the surface of the window plate 2, as shown in FIG. 3, and contributes to realize smooth or so-called flush outer surface of the automobile body. The free end of the lip section 4b along the side portions 6 of the molding member 4 is spaced from the surface of the window plate 2, as shown in FIG. 2, and defines a weir or channel 8 along each side portion. Thus, during the driving in a rainy condition, the rain water is guided along the channel 8 and is prevented from flowing across the side portion 6 of the molding member 4 to effectively preserve the driver's and/or passenger's sight through the side windows. Along the corner portions 11 of the molding member 4, the lip section 4b has a transient cross-section in which the section for the side portions 6 gradually changes to that for the upper portion 5. Separate corner connection piece is not required, and it is possible to provide a refined appearance of the molding member due to its outer surface which is continuous completely throughout the entire length.

In the above-mentioned embodiment of the method according to the present invention, the elongate member 22B as extruded has the cross-section of the side portions 6 throughout its entire length, and is then subjected to a local deformation of the lip section 4b to have the -cross-section of the upper portion 5. However, it is of course that the extruded elongate member 22B may have the cross-section of the upper portion 5 throughout the entire length, and may be subjected to a local deformation of the lip section 4b to have the cross-section of the side portions 6. Alternatively, the elongate member 22B may have an intermediate cross-section that the lip section 4b as extruded is slightly spaced from the surface of the window plate 2, and may be subjected to deformation of the lip section 4b along the entire length to have the cross-sections of the upper portion 5 and the side portions 6.

Figure 11B:
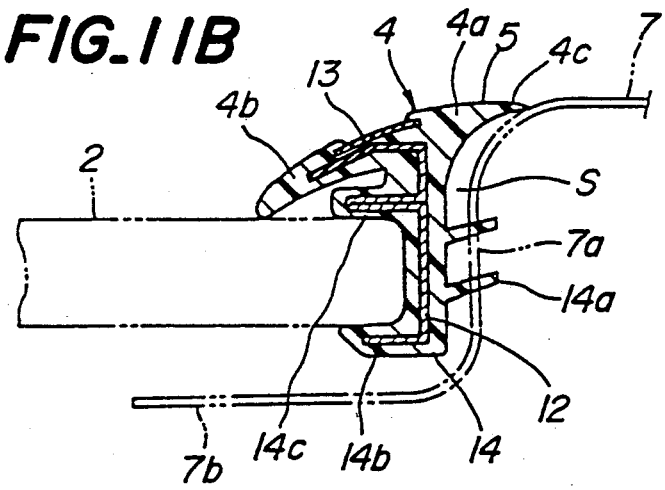

The deformation of the lip section 4b may be carried out without heating and softening the material, by arranging a plastically deformable core element 12 to extend in the lip section 4b of the elongate member 22B as shown in FIGS. 11A and 11B. By this, the lip section 4b can be deformed into the desired cross-section by subjecting the core element 12 to a plastic deformation.

The ornamental film 13 to be partly exposed outside of the molding member 4 may become wavy during the axial bending of the elongate member 22B, which is quite undesirable in that the appearance of the molding member 4 substantially deteriorates. Consequently, the ornamental film 13 should have a sufficient flexibility which can be achieved, e.g., by a smaller thickness of the film. Thus, when the ornamental film 13 includes a polyethyleneterephthalate (PET) film, the PET film should have a thickness of 5-20 μm to preserve the required flexibility.

Furthermore, the die plates in the shaping device 26, particularly the upper die plate 28, should have outer surface which effectively prevents the elongate member 22B from becoming scratchy during the axial bending thereof. Thus, the die plates may be formed of synthetic resin material with a low friction resistance as well as high heat resistivity and hardness, or may be formed of a metallic material whose surface to be brought into contact with the elongate member 22B is like a mirror-finished surface.

The molding member according to the present invention is not limited to a product which is composed of an extruded synthetic resin material as in the above-mentioned embodiment. Thus, it may be composed of an extruded profiled body of aluminum alloy or other suitable metallic material, or may be composed of a roll-formed metal strip.

When there is a fluctuation or difference in the distance between the front or rear pillars of the automobile body panel, the molding member may be divided into separately prepared right and left molding halves, which are to be connected at the center of the upper edge of the window plate by using a connector. Even with this arrangement, an uninterrupted connection along the corner portions of the molding member, between the upper and side portions thereof, provides a more refined appearance as compared with the conventional molding member, including separate corner connection pieces along the corner portions whereby the connections between the upper and side portions are interrupted.

Another embodiment of the front window molding member according to the present invention will now be explained with reference to FIGS. 12A and 12B, showing the cross-section for the side portions 6 and the cross-section for the upper portion 5, respectively. This embodiment differs from the previous embodiment essentially in that the core element 12 of the molding 1 member 4 is composed of an unprofiled, sheet-like strip material in order to prevent shrinkage. This molding member 4 can be efficiently produced by a production line shown in FIG. 13, which is quite similar to that shown in FIG. 5, including an uncoiler 18 and a pinch roller 40 for continuously supplying the strip 19 as the core element 12, a detector 41 for detecting the supplied length of the strip 19, such as a rotary encoder, as well as a shaping device 42 which is adapted to locally deform the lip section 4b of the extruded continuous rod 22 according to the supplied length of the strip 19 detected by the detector 41.

As particularly shown in FIGS. 14 and 15, the shaping device 42 is arranged on the end plate 43 of the extrusion die 21 adjacent to the extrusion orifice 44 for the extruded continuous rod 22. The device 42 includes a deforming bar 45 which is integral with an arcuate rack 46, and which is adapted to engage with the surface of the lip section 4b of the extruded continuous rod 22 to be deformed. The rack 46 is in mesh with a pinion 47 and is guided by a pair of guide members 48, 49 defining an arcuate path with a radius R, whose center of curvature is preferably situated at the junction of the leg section 14 and the lip sections 4b, 4c of the continuous rod 22. The deforming bar 45 is preferably biased by a spring 50 toward its neutral position which is shown in FIG. 14. The deforming bar 45 has an inclined guide surface 51 adjacent to the end plate 43, as shown in FIG. 16, which is brought into an initial contact with the lip section 4b to be deformed, immediately after the lip section 4b has been extruded from the extrusion die 21. The shaping device 42 further includes a coolant supply pipe 52 (FIG. 15) for supplying coolant, such as cooled air, to cool down the continuous rod 22 during or after the deformation.

Though not shown in the drawings, the detector 41 is connected to a suitable controller which controls a reversible servomotor for driving the pinion 47 by a predetermined angular amount corresponding to the supplied length of the strip material 19. Thus, assuming that the cross-section of the lip section 4b as extruded is for the upper portion of the molding member 4, detection of the supplied length of the strip material 19 makes it possible to identify the lip section 4b intended to extend along the side portions 6 of the molding member 4, and to deform such lip section 4b as soon as it has been extruded from the extrusion die 21, by actuating the servomotor to drive the pinion 47. The rack 46 is thus moved clockwisely, from the position of FIG. 14 to the position of FIG. 15, along the arcuate path defined by the guide members 48, 49 and against the force of the spring 50. As a result, the deforming bar 45 in contact with the surface of the lip section 4b is also moved clockwisely, to locally deform the lip section 4b while it is still hot and soft, and thereby to achieve the cross-section for the side portions 6. The cross-section for the side portions 6 obtained from the deformation as above can be stabilized immediately thereafter, by discharging cooled air from the pipe 52 to cool down the deformed lip section 4b.

The relationship between the supplied length L of the strip material 19 and the displacement angle $\theta$ of the deforming bar 45 is shown in FIG. 17, and will be explained below. First of all, as the detector 41 detects that the supply of the strip material 19 has been started, the servomotor drives the pinion 47 in a normal direction so that the deforming bar 45 moves to its extreme angular position shown in FIG. 15, in which the lip section 4b is deformed to have a cross-section for the side portions 6 of the molding member 4. The deforming bar 45 is kept in such an extreme position until supply of the length $l_1$ of the strip material 19, corresponding to one of the side portions 6 of the molding member 4, is completed. When the detector 41 detects that the length $l_1$ of the strip material 19 has been supplied, the servomotor begins to drive the pinion 47 in a reverse direction, and this results in an angular return movement of the deforming bar 45 toward its neutral position shown in FIG. 14. Such a movement of the deforming bar 45 is maintained during supply of the length $l_2$ of the strip material 19, corresponding to one of the corner portions 11 of the molding member 4. The neutral position of the deforming bar 45 corresponds to the upper portion 5 of the molding member 4, and is thus maintained during the supply of the length $l_3$ of the strip material 19. During a next supply of the length $l_2$ of the strip material, corresponding to another corner portion 11, the deforming bar 45 is maintained in an angular movement toward its extreme position shown in FIG. 15. The renewed extreme position of the deforming bar 45 is maintained until supply of another length $l_1$ of the strip material, corresponding to another side portion 6 of the molding member 4, is completed. Thereafter, the continuous rod 22 is cut at a predetermined location C into the predetermined length of the molding member 4.

In order to further improve the productivity, it is advantageous to maintain the deforming bar 45 in its extreme angular position shown in FIG. 15 during the supply of a length $2l_1$, of the strip material 19, and simultaneously form a connected pair of side portions for two molding members to be separated from each other at a position which corresponds to the length $l_1$, i.e. The intermediate position of the supplied length $2l_1$.

The window molding member 4 produced as above is generally straight throughout the entire length, and is subjected to an axial bending along the corner portions 11 when it is mounted in a predetermined position. To this end, the window plate 2 is first secured to the depressed seat portion 7b of the automobile body panel 7 essentially as in the previous embodiment, by using an adhesive material 9. The molding member 4 is then inserted into the space S between the body panel 7 and the peripheral edge of the window plate 2, before the adhesive material 9 completely hardens, while being axially bent along the corner portions 11. The molding member 4 has a leg section 14 whose fins 14a are brought retainer member 15 secured to the shoulder portion 7a of the body panel. Similarly, the projection 14b of the leg section 14 is brought into engagement with the rear edge of the window plate 2. Thus, the molding member 4 is firmly retained in position after the adhesive material completes the hardening.

As in the previous embodiment, the window molding member 4 mounted in place has the free end of the lip section 4b along the upper portion 5 of the molding member 4, which is in contact with the surface of the window plate 2, as shown in FIG. 12B, and contributes to realize smooth or so-called flush outer surface of the automobile body. The free end of the lip section 4b along the side portions 6 of the molding member 4 is spaced from the surface of the window plate 2, as shown in FIG. 12A, and defines a channel 8 along each side portion. Thus, during the driving in a rainy condition, the rain water is guided along the channel 8 and is prevented from flowing across the molding member 4 to effectively preserve the driver's and/or passenger's sight through the side windows. Along the corner port 11 of the molding member 4, the lip section 4b has a transient cross-section in which the section for the side portions 6 gradually changes to that for the upper portion 5. Separate corner connection piece is not required, and it is thus possible to provide a refined appearance of the molding member due to its outer surface which is continuous completely throughout the entire length. The molding member of the present embodiment is further advantageous in that it can be produced completely continuously and, hence, with a remarkably improved productivity.

Figure 6:
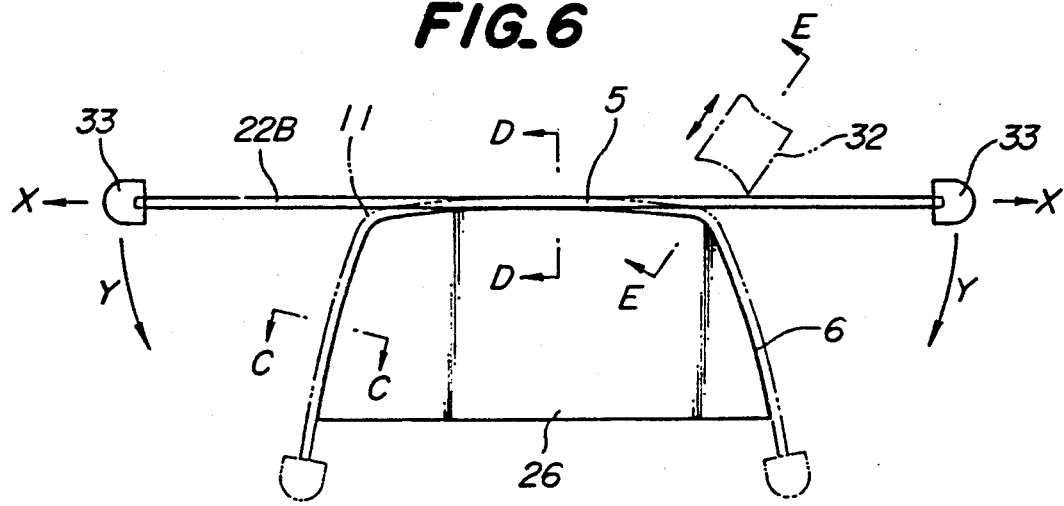
FIG. 6 is a plan view of an axial bending and shaping device which is included in the production line.

The shaping device 42 explained above with reference to FIGS. 14 to 16 may be incorporated in the production line as shown in FIG. 5 for producing the molding member of the previous embodiment. In this case, it is of course that the shaping device 26 as shown in FIG. 6 is still required, however, solely to subject the elongate member 22B to an axial bending into conformity with the contour of the window plate 2, due to the presence of a profiled core element 12 embedded in the main body 4a.

Figure 18:
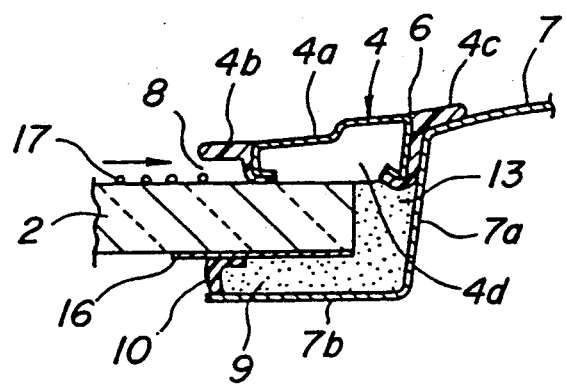
FIG. 18 is a sectional view of the side portion of a window molding member according to another embodiment of the present invention.
Figure 19:
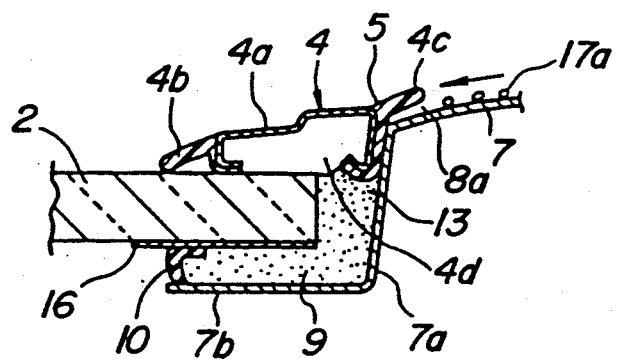
FIG. 19 is a sectional view of the upper portion of the molding member of FIG. 18.

Another embodiment of the molding member according to the present invention is shown in FIGS. 18 and 19. The molding member 4 of this embodiment includes a main body 4a which is composed of a metal strip, such as stainless steel or aluminum strip, subjected to a roll forming into the desired profile. The main body 4a is provided with lip sections 4b, 4c formed of a synthetic resin material to project from both sides of the main body. Along the side portion 6 of the molding member 4, as shown in FIG. 18, the free end of the lip section 4b is spaced from the surface of the window plate 2 to define a channel or weir 8, while the free end of the opposite lip section 4c is in contact with the surface of the automobile body panel 7. On the other hand, along the upper portion 5 of the molding member 4, as shown in FIG. 19, the free end of the lip section 4b is in contact with the surface of the window plate 2, while the free end of the opposite lip section 4c is spaced from the surface of the body panel 7 or the roof panel to define a channel or weir 8a which serves to effectively prevent the rain water 17a on the roof panel from flowing across the molding member 4 onto the front or rear window plate 2 to disturb the driver's sight through the window. The main body 4a of the molding member 4 has an inner space 4d which accommodates clips or the like fittings (not shown) for securing the molding member 4 into the space between the body panel 7 and the window plate 2.

The molding member of this embodiment can be produced by a production line which is essentially the same as that shown in FIGS. 13 to 16, but which includes a roll form station for shaping the metal strip into the main body 4a. The shaping station has to be provided with two deforming bars 45, one for deforming the lip section 4b, and the other for the lip section 4c.

Still another embodiment of the window molding member according to the present invention will now be explained below with reference to FIGS. 20 to 24. The molding member 4 of this embodiment has a main body 4a with lip sections 4b, 4c projecting from both sides thereof. As in the previous embodiments, the lip section 4b has a free end which bears against the surface of the window plate 2 along the upper portion 5 on the molding member 4 (FIG. 20), while the free end of the lip section 4b is spaced from the surface of the window plate 2 along the side portions 6 (FIG. 21). The lip section 4b is formed, along the entire length, with a longitudinal slit 4e in its rear surface which is opposed to the surface of the window plate 2. An injection-molded spacer member 60 is arranged between the rear surface of the lip section 4b and the surface of the window plate 2 along the side portions 6 of the molding member 4. The spacer member 60 is provided with a ridge or projection which engages into the slit 4e, and forms an integral part of the molding member 4. The spacer member 60 may have a terminal end adjacent to the corner portion 11, whose height gradually decreases toward the corner portions 11 (FIG. 22).

The window molding member 4 of this embodiment can be produced by a production line which is essentially the same as that shown in FIG. 5, but which does not require the roll forming station for the core element 12 due to its unprofiled cross-section. After the extruded continuous body is cut into a straight elongate member 22B of a predetermined length, each side portion 6 of the elongate member 22B is placed in an injection mold 61 as shown in FIGS. 23 and 24 and integrally provided with the spacer member 60. Assuming that the side portions 6 of two elongate members 22B are simultaneously subjected to injection molding in a common injection mold 61, the injection mold 61 includes a core 62 and a mold body 63 with grooves 64 for receiving the leg sections 14 of two elongate members 22B, cavities 65 in which the spacer members 60 are formed, as well as a runner 66, sprues 67 and gates 68 for introducing into the cavities 65 a molten synthetic resin material of the spacer member 60.

Each side portion 6 of the elongate member 22B is arranged in place in the following manner. The leg section 14 of the elongate member 22B is inserted into the groove 64, and the main body 4a and the lip sections 4b, 4c are then tightly clamped between the core 62 and the mold body 63. As a result, the lip section 4b to be provided with the spacer member 60 is deflected upwardly about the slit 4e, with its rear surface being opposed to the cavity 65. The molten synthetic resin from the runner 66 is then introduced into the cavity 65 through the sprue 67, and is thus molded into the spacer member 60 as an integral part of the lip section 4b.

The molding member 4 produced as above is similar to that shown in FIGS. 12A and 12B in that it is generally straight throughout the entire length. Thus, the molding member 4 is subjected to an axial bending along the corner portions 11 when it is mounted in a predetermined position. To this end, the window plate 2 is first secured to the depressed seat portion 7b of the automobile body panel 7 by using an adhesive material 9. The molding member 4 is inserted into the space S between the body panel 7 and the peripheral edge of the window plate 2, before the adhesive material completely hardens, while being axially bent along the corner portions 11. The molding member 4 has a leg section 14 whose fins 14a are brought into engagement with the corresponding fins of the retainer member 15 secured to the shoulder portion 7a of the body panel. Similarly, the projection 14b of the leg section 14 is brought into engagement with the rear edge of the window plate 2. Thus, the molding member 4 is firmly retained in position after the adhesive material 9 completes the hardening.

Figure 20:
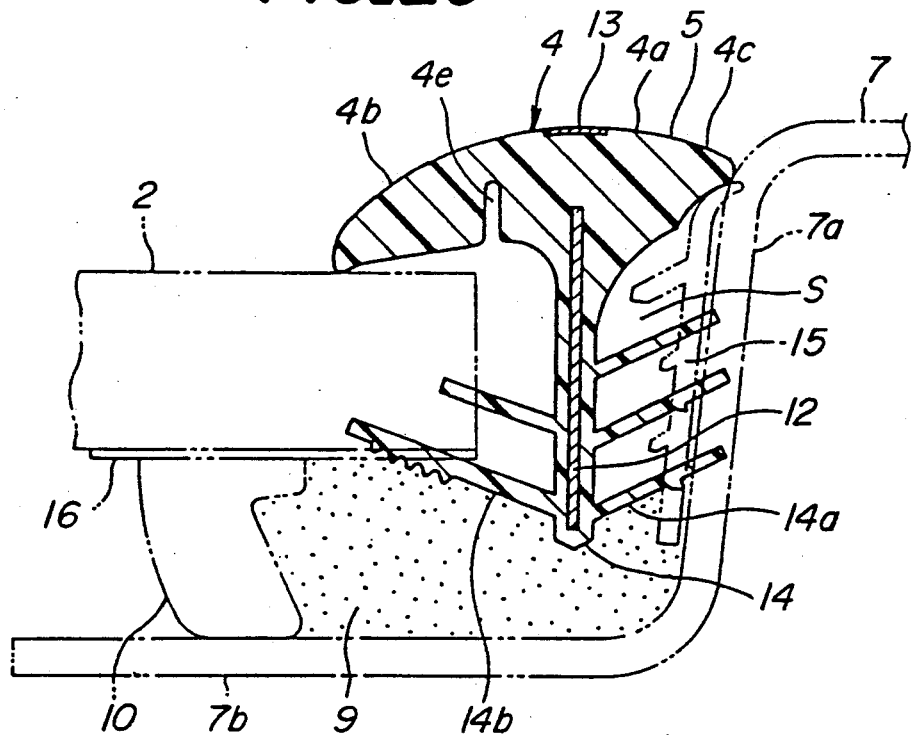
FIG. 20 is a sectional view of the upper portion of a window molding member according to still another embodiment of the present invention.
Figure 21:
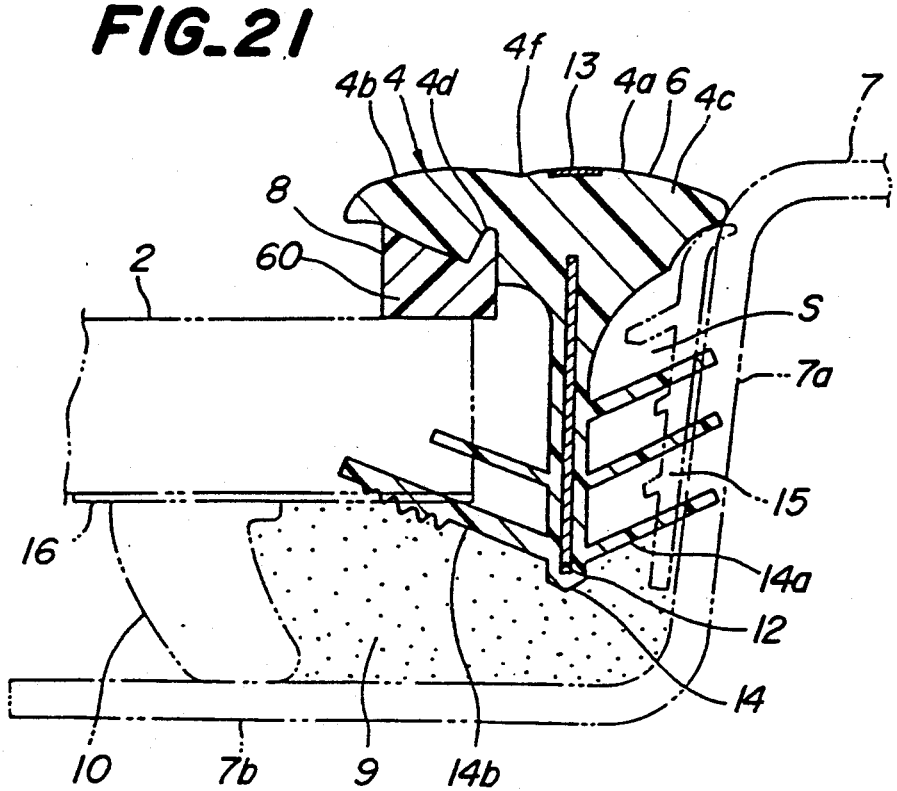
FIG. 21 is a sectional view of the side portion of the molding member of FIG. 20.

As in the previous embodiments, the window molding member 4 mounted in place has the free end of the lip section 4b along the upper portion 5, which bears against the surface of the window plate 2, as shown in FIG. 20, and contributes to realize smooth or so-called flush outer surface of the automobile body. The free end of the lip section 4b along the side portions 6 of the molding member 4 is spaced from the surface of the window plate 2, as shown in FIG. 21, and cooperates with the spacer member 60 to define a channel 8 along each side portion 6. Thus, during the driving in a rainy condition, the rain water is guided along the channel 8 and is prevented from flowing across the molding member 4 to effectively preserve the driver's and/or passengers' sight through the side windows. Along the corner portions 11 of the molding member 4, the lip section 4b has a transient cross-section in which the section for the side portions 6 gradually changes to that for the upper portion 5. Separate corner connection piece is not required, and it is thus possible to provide a refined appearance of the molding member due to its outer surface which is continuous completely throughout the entire length. The molding member of the present embodiment is advantageous in that the cross-section of the channel 8 can be stably retained by the spacer member 60. Moreover, it becomes possible to provide an improved appearance in that burrs which may be formed during the injection molding process are not visible from outside.

The window molding member shown in FIGS. 20 to 22 may be modified such that the lip section 4b projecting from the main body 4a has a plurality of longitudinal slits 4e on its rear surface opposite to the surface of the window plate 2, as shown in FIG. 25. Provision of a plurality of slits 4e, on one hand, serves to prevent formation of shallow recess 4f (FIG. 21) on the outer surface of the lip section 4b as it is deflected upwardly, and to thereby realize a smooth outer surface of the lip section 4b; it serves, on the other hand, to improve the integral connection of the spacer member 60 to the lip section 4b.

Advantageously, the spacer member 60 is composed of a synthetic resin material having a compatibility with, or cross-solubility to the material of the lip section 4b, as the spacer member 60 can then be readily and tightly integrated with the lip section 4b without using adhesive material. A soft and flexible material is preferably used to form the spacer member 60, for minimizing the risk of surface scratch formation on the window plate 2 during the assembly. The material for the spacer member 60 is of a color whose tone is close to that of the remaining resin region of the molding member 4. This, however, is not critical because the spacer element 60 is arranged on the rear side of the lip section 4b, when the molding member 4 is mounted in position, and so is not clearly visible from outside. Since the major part of the spacer element 60 is not subjected to direct irradiation of sunlight, the spacer member 60 need not be formed of a synthetic resin material with a weathering resistance. The spacer member 60 is preferably composed of a thermoplastic synthetic resin material, because the material of the spacer member 60 is then permitted to undergo a plastic deformation during the injection molding, and minimizes the internal stress.

It will be readily appreciated from the foregoing detailed description that, in accordance with the present invention, the longitudinally variable cross-section of the molding member can be readily realized, by simply deforming the lip section in the form of a ridge on the main body so as to define a pair of banks or channels or weirs along the side portions of the molding member. It is not necessary to prepare separate components of a molding member and to connect them with each other either by an injection process or by corner connection pieces, so that the present invention makes it possible to highly improve the productivity and to preserve an excellent appearance of the product in an advantageous manner.

What is claimed is:

1. A window molding member adapted to be mounted on an exterior portion of an automobile and the like, comprising:

a main body composed at least partly of a continuous elongate member, including an upper portion to extend along an upper edge of a window plate, at least one side portion to extend along a side edge of the window plate, and at least one corner portion integrally connecting said upper portion and said side portion with each other to provide a one-piece structure, the main body further including a ridge integrally formed along an entire length of said main body;

said ridge having a predetermined region presubjected to permanent plastic deformation to form a first cross-section along said upper portion of the main body, a second cross-section along said side portion of the main body, and a transitional cross-section substantially along said corner portion of the main body where the first cross-section gradually changes to the second cross-section, one of said first and second cross-sections defining at least one weir when the molding member is mounted in place, said weir extending along said upper portion or said side portion such that rain water can be guided along the weir and prevented from flowing across the molding member.

2. The window molding member as claimed in claim 1, wherein said main body is of extruded synthetic resin material.

3. The molding member as claimed in claim 1, wherein said man body has a core embedded therein, which is composed of a flexible metal strip.

4. The molding member as claimed in claim 3, wherein said core has in its cross-section at least one projection to extend toward said window plate.

5. The molding member as claimed in claim 4, wherein said main body has a curvature in its longitudinal direction, which corresponds to the contour of said window plate.

6. The molding member as claimed in claim 1, wherein said main body is provided with at least one spacer element to be arranged between said ridge and the surface of said window plate, for cooperating with said ridge to define said weir.

7. The molding member as claimed in claim 6, wherein said ridge has a surface adapted to be arranged opposite to the surface of said window plate, said surface of the ridge being formed with at least on slit which is engageable with said spacer element along said weir.

8. A method of manufacturing window moldings for automobiles and the like, said method comprising the steps of:

forming a main body composed at least partly of a continuous elongate material, including an upper portion to extend along an upper edge of a window plate, at least one side portion to extend along a side edge of the window plate, and at least one corner portion integrally connecting said upper portion and said side portion with each other, the main body further having an integral ridge formed to extend over its entire length; and plastically deforming a predetermined region of said ridge such that the ridge has a first cross-section along said upper portion of the mainbody, a second cross-section along said side portion of the main body, and a transitional cross-section substantially along said corner portion where the first cross-section gradually changes to the second cross-section, one of said first and second cross-sections defining at least one weir when the molding member is mounted in place, said weir extending along said upper portion or said side portion so that rain water can e guided along the weir and prevented from flowing across the molding member.

* * * * *

UNITED STATES PATENT AND TRADEMARK OFFICE
CERTIFICATE OF CORRECTION

PATENT NO. : 5,107,646

DATED : April 28, 1992

INVENTOR(S) : Tatsuya TAMURA

It is certified that error appears in the above-identified patent and that said Letters Patent is hereby corrected as shown below:

Column 14, lines 35-60, delete claim 8 in its entirety.

Signed and Sealed this

Twenty-eighth Day of December, 1993

Attest:

BRUCE LEHMAN

Attesting Officer

Commissioner of Patents and Trademarks